United States Patent
Porras et al.

(10) Patent No.: US 9,950,638 B2
(45) Date of Patent: Apr. 24, 2018

(54) PRECONDITIONING AN ELECTRIC VEHICLE

(71) Applicant: Ford Global Technologies, LLC, Dearborn, MI (US)

(72) Inventors: Angel Fernando Porras, Dearborn, MI (US); Timothy Noah Blatchley, Dearborn, MI (US); Mark G. Smith, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 290 days.

(21) Appl. No.: 14/795,968

(22) Filed: Jul. 10, 2015

(65) Prior Publication Data

US 2017/0008407 A1 Jan. 12, 2017

(51) Int. Cl.
*B60L 11/18* (2006.01)
*B60H 1/00* (2006.01)

(52) U.S. Cl.
CPC ........ *B60L 11/187* (2013.01); *B60H 1/00278* (2013.01); *B60H 1/00921* (2013.01); *B60L 11/1874* (2013.01); *B60L 11/1875* (2013.01); *B60H 2001/00307* (2013.01); *B60H 2001/00928* (2013.01)

(58) Field of Classification Search
CPC combination set(s) only.
See application file for complete search history.

(56) References Cited

U.S. PATENT DOCUMENTS

| | | | |
|---|---|---|---|
| 7,287,581 B2 | 10/2007 | Ziehr et al. | |
| 8,620,506 B2 | 12/2013 | Kummer et al. | |
| 9,822,752 B2* | 11/2017 | Ragazzi | F02N 19/10 |
| 2008/0179040 A1 | 7/2008 | Rosenbaum | |
| 2008/0275600 A1* | 11/2008 | Rask | B60K 6/24 701/22 |
| 2010/0012295 A1 | 1/2010 | Nemesh et al. | |
| 2012/0225341 A1 | 9/2012 | Major et al. | |
| 2012/0291987 A1 | 11/2012 | Himmer et al. | |
| 2012/0297809 A1 | 11/2012 | Carpenter | |
| 2013/0299129 A1* | 11/2013 | Osaka | B60H 1/0005 165/59 |
| 2014/0070013 A1 | 3/2014 | Stanek et al. | |

(Continued)

FOREIGN PATENT DOCUMENTS

FR 2976224 B1 5/2013

*Primary Examiner* — Thomas G Black
*Assistant Examiner* — Ana D Thomas
(74) *Attorney, Agent, or Firm* — David B. Kelley; Brooks Kushman P.C.

(57) ABSTRACT

A vehicle includes a cabin, a traction battery configured to receive wall power from a charging station, a coolant circuit, a heat pump and a controller. The coolant circuit includes the battery, a heater core, a heat exchanger, and valving. The heat pump is in fluid communication with the heat exchanger. The controller is programmed to, in response to a request to heat the battery and the cabin, and a time to next planned usage of the vehicle being less than a first threshold time, actuate the valving to circulate coolant to the heater core and not the battery when wall power is available, and energize the heat pump to supply heat to the coolant circuit via the heat exchanger when an ambient air temperature exceeds a threshold temperature. The disclosure also includes a method for preconditioning a vehicle.

20 Claims, 7 Drawing Sheets

(56) References Cited

U.S. PATENT DOCUMENTS

| | | | |
|---|---|---|---|
| 2014/0196485 A1* | 7/2014 | Lombardo | F25B 30/02 62/89 |
| 2014/0216709 A1* | 8/2014 | Smith | B60H 1/00642 165/287 |
| 2014/0326430 A1 | 11/2014 | Carpenter et al. | |
| 2015/0102118 A1* | 4/2015 | Hirabayashi | B60H 1/004 237/12.3 R |
| 2015/0217622 A1* | 8/2015 | Enomoto | B60H 1/00878 165/42 |
| 2015/0217623 A1* | 8/2015 | Hatakeyama | B60L 1/003 165/42 |
| 2015/0258875 A1* | 9/2015 | Enomoto | B60L 1/003 165/104.31 |
| 2015/0298522 A1* | 10/2015 | Hirabayashi | F02D 41/068 701/36 |
| 2015/0330351 A1* | 11/2015 | Ragazzi | F02M 31/16 123/552 |
| 2016/0018145 A1* | 1/2016 | Ragazzi | F25B 5/04 62/84 |
| 2016/0033175 A1* | 2/2016 | Ragazzi | F25B 13/00 62/115 |
| 2016/0332504 A1* | 11/2016 | Blatchley | B60H 1/00921 |
| 2017/0008375 A1* | 1/2017 | Blatchley | B60H 1/2218 |
| 2017/0008407 A1* | 1/2017 | Porras | B60L 11/187 |

* cited by examiner

PRECONDITIONING AN ELECTRIC VEHICLE

TECHNICAL FIELD

The present disclosure relates to a control strategy and method for preconditioning a traction battery, a passenger cabin, or both of a motor vehicle.

BACKGROUND

The need to reduce fuel consumption and emissions in automobiles and other vehicles is well known. Vehicles are being developed that reduce reliance or completely eliminate reliance on internal-combustion engines. Electrified vehicles are one type of vehicle currently being developed for this purpose. A major challenge with electric vehicles is increasing the electric range of the vehicle.

SUMMARY

According to one embodiment, a vehicle includes a cabin, a traction battery configured to receive wall power from a charging station, a coolant circuit, a heat pump, and a controller. The coolant circuit includes the battery, a heater core, a heat exchanger, and valving. The heat pump is in fluid communication with the heat exchanger. The controller is programmed to, in response to a request to heat the battery and the cabin, and a time to next planned usage of the vehicle being less than a first threshold time, actuate the valving to circulate coolant to the heater core and not the battery when wall power is available, and energize the heat pump to supply heat to the coolant circuit via the heat exchanger when an ambient air temperature exceeds a threshold temperature.

According to another embodiment, a vehicle includes a cabin, a traction battery configured to receive wall power from a charging station, a coolant circuit, a heat pump, and a controller. The coolant circuit includes the battery, a heater core, a heat exchanger, and valving. The heat pump is in fluid communication with the heat exchanger. The controller is programmed to, in response to a request to heat the battery and the cabin, and a time to next planned usage of the vehicle exceeding a threshold time, actuate the valving to circulate coolant to the battery and the heater core when wall power is available, and energize the heat pump to supply heat to the coolant circuit via the heat exchanger when an ambient air temperature exceeds a threshold temperature.

According to yet another embodiment, a method for preconditioning a vehicle includes, in response to a request to heat a battery and cabin, and a time to next planned usage of the vehicle being less than a first threshold time, actuating valving to circulate coolant to a heater core and not a battery when wall power is available. The method also includes energizing a heat pump to supply heat to the heater core when an ambient air temperature exceeds a threshold temperature.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
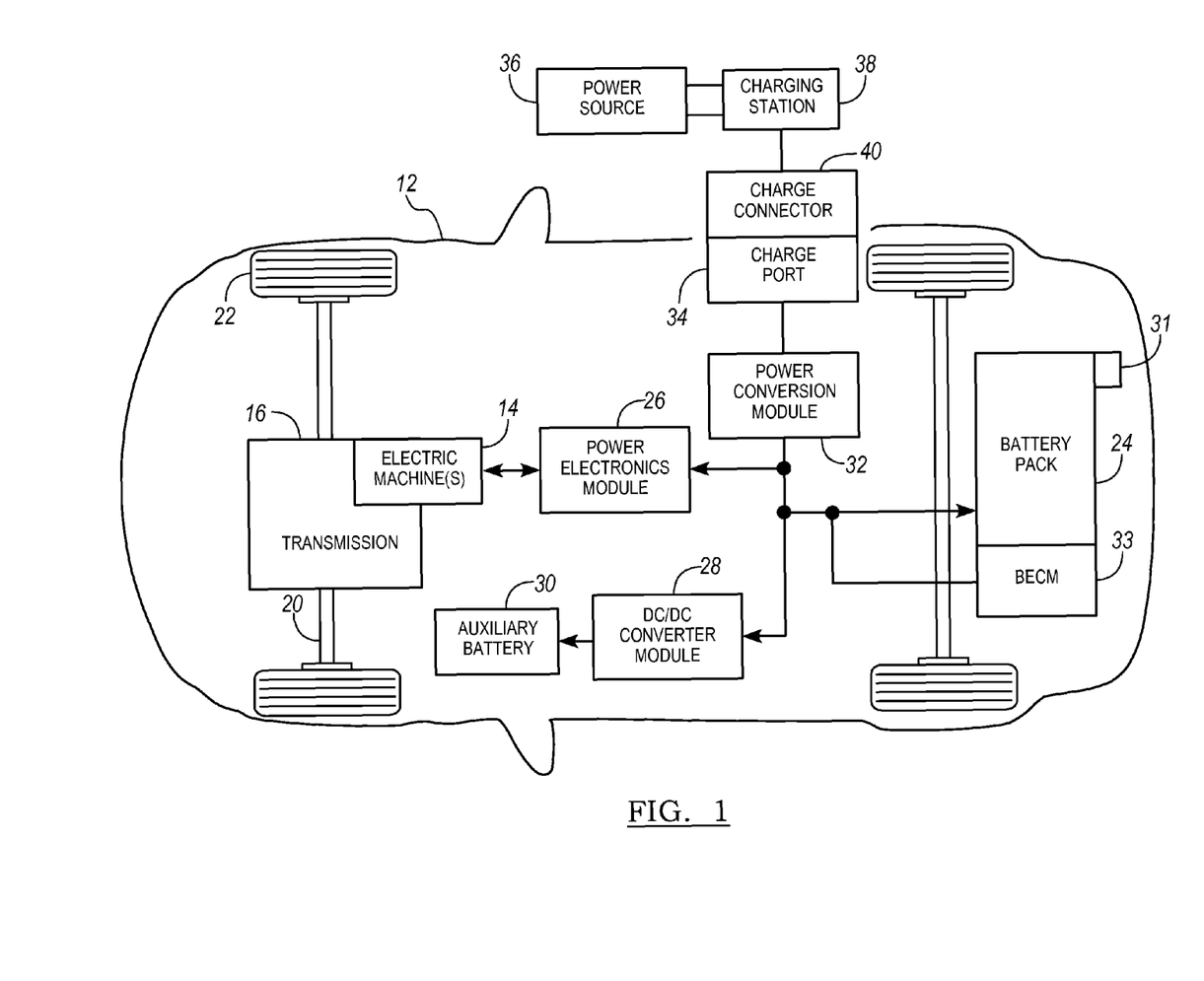
FIG. 1 is a schematic diagram of an example hybrid vehicle.

FIG. 1 depicts a schematic of a typical battery-electric vehicle (BEV). Certain embodiments, however, may also be implemented within the context of plug-in hybrid-electric vehicles. The vehicle 12 includes one or more electric machines 14 mechanically connected to a transmission 16. The electric machines 14 may be capable of operating as a motor or a generator. If the vehicle is a hybrid-electric vehicle, the transmission 16 is mechanically connected to an engine (not shown). The transmission 16 is mechanically connected to the wheels 22 via a drive shaft 20. The electric machines 14 can provide propulsion and deceleration capability. The electric machines 14 also act as generators and can provide fuel economy benefits by recovering energy through regenerative braking.

A traction battery or battery pack 24 stores energy that can be used by the electric machines 14. The traction battery 24 typically provides a high-voltage direct current (DC) output from one or more battery cell arrays, sometimes referred to as battery cell stacks, within the traction battery 24. The battery cell arrays may include one or more battery cells.

The battery cells (such as a prismatic, pouch, cylindrical, or any other type of cell), convert stored chemical energy to electrical energy. The cells may include a housing, a positive electrode (cathode) and a negative electrode (anode). An electrolyte may allow ions to move between the anode and cathode during discharge, and then return during recharge. Terminals may allow current to flow out of the cell for use by the vehicle.

Different battery pack configurations are available to address individual vehicle variables including packaging constraints and power requirements. The battery cells may be thermally regulated with a thermal management system. Examples of thermal management systems include air-cooling systems, liquid-cooling systems, and a combination of air and liquid systems.

The traction battery 24 may be electrically connected to one or more power electronics modules 26 through one or more contactors (not shown). The one or more contactors isolate the traction battery 24 from other components when opened, and connect the traction battery 24 to other components when closed. The power electronics module 26 may be electrically connected to the electric machines 14 and may provide the ability to bi-directionally transfer electrical energy between the traction battery 24 and the electric machines 14. For example, a typical traction battery 24 may provide a DC voltage while the electric machines 14 may require a three-phase alternating current (AC) voltage to function. The power electronics module 26 may convert the DC voltage to a three-phase AC voltage as required by the electric machines 14. In a regenerative mode, the power-electronics module 26 may convert the three-phase AC voltage from the electric machines 14 acting as generators to the DC voltage required by the traction battery 24.

In addition to providing energy for propulsion, the traction battery 24 may provide energy for other vehicle electrical systems. A typical system may include a DC/DC converter module 28 that converts the high-voltage DC output of the traction battery 24 to a low-voltage DC supply that is compatible with other vehicle components. Other high-voltage loads, such as air conditioning compressors and electric heaters, may be connected directly to the high-voltage supply without the use of a DC/DC converter module 28. In a typical vehicle, the low-voltage systems are electrically connected to the DC/DC converter and an auxiliary battery 30 (e.g., a 12 volt battery).

A battery energy control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24.

The vehicle 12 may be recharged by an external power source 36. The external power source 36 may be a connection to an electrical outlet connected to the power grid or may be a local power source (e.g. solar power). The external power source 36 is electrically connected to a vehicle charging station 38. The charger 38 may provide circuitry and controls to regulate and manage the transfer of electrical energy between the power source 36 and the vehicle 12. The external power source 36 may provide DC or AC electric power to the charger 38. The charger 38 may have a charge connector 40 for plugging into a charge port 34 of the vehicle 12. The charge port 34 may be any type of port configured to transfer power from the charger 38 to the vehicle 12. The charge port 34 may be electrically connected to a charger or on-board power-conversion module 32. The power-conversion module 32 may condition the power supplied from the charger 38 to provide the proper voltage and current levels to the traction battery 24. The power-conversion module 32 may interface with the charger 38 to coordinate the delivery of power to the vehicle 12. The charger connector 40 may have pins that mate with corresponding recesses of the charge port 34. In other embodiments, the charging station may be an induction charging station. Here, the vehicle may include a receiver that communicates with a transmitter of the charging station to wirelessly receive electric current.

The charging station 38 comes in various embodiments that have different power output capacities. For example, some stations 38 can output between 6 to 10 kilowatts (kW), while others can only output 1 to 2 kW. The power output of a charging station is dependent upon the voltage available and the current capacity of the circuitry.

The various components discussed may have one or more controllers to control and monitor the operation of the components. The controllers may communicate via a serial bus (e.g., Controller Area Network (CAN)) or via dedicated electrical conduits. The controller generally includes any number of microprocessors, ASICs, ICs, memory (e.g., FLASH, ROM, RAM, EPROM and/or EEPROM) and software code to co-act with one another to perform a series of operations. The controller also includes predetermined data, or "look up tables" that are based on calculations and test data, and are stored within the memory. The controller may communicate with other vehicle systems and controllers over one or more wired or wireless vehicle connections using common bus protocols (e.g., CAN and LIN). Used herein, a reference to "a controller" refers to one or more controllers.

Figure 2:
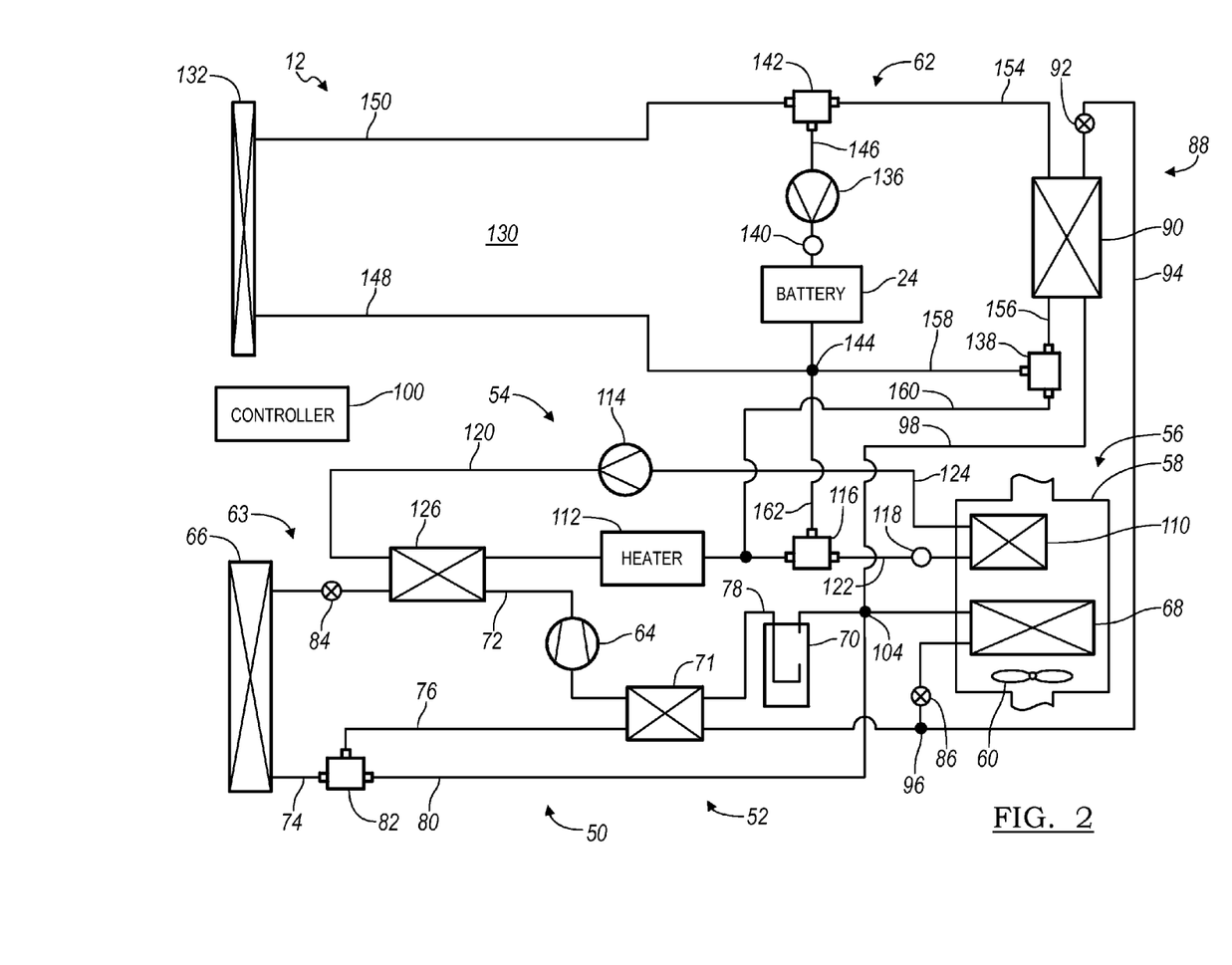
FIG. 2 is a schematic diagram of a battery thermal management system and a climate control system of a vehicle.

The traction battery 24, the passenger cabin, and other vehicle components are thermally regulated with one or more thermal management systems. Example thermal management systems are shown in the Figures and described below. Referring to FIG. 2, the vehicle 12 includes a cabin and an engine compartment that are separated by a bulkhead. Portions of the various thermal management systems may be located within various areas of the vehicle, such as the engine compartment and the cabin. The vehicle 12 includes a climate control system 50 having a heat-pump subsystem 52, a cabin-heating subsystem or cabin loop 54, and a ventilation subsystem 56.

The ventilation subsystem 56 may be disposed within the dash of the cabin. The ventilation subsystem 56 includes an HVAC housing 58 having an air-inlet side and air-outlet side. The outlet side is connected to ducts that distribute exiting air into the cabin. A blower motor drives a fan (or cabin blower) 60 for circulating air in the ventilation subsystem 56. The vehicle 12 may also include a battery thermal-management system 62 for regulating the temperature of the traction battery 24. The battery thermal-management system 62 and the climate control system 50 may be connected in fluid communication to form a single thermal circuit. In some embodiments, the battery thermal-management system 62 and the climate control system 50 are selectively connected in fluid communication to form a single thermal circuit during certain operating conditions, and are separate thermal circuits during other operating conditions.

The heat pump 52 provides air conditioning of the cabin during some operating modes and is a heat source for the cabin-heating subsystem 54 during other operating modes. The heat pump 52 also cools the battery 24 during some operating modes and heats the battery during other operating modes. The heat pump subsystem 52 may be a vapor-compression heat pump that circulates a refrigerant transferring thermal energy to various components of the climate control system 50. The heat pump 52 may include a cabin loop 63 having a compressor 64, an exterior heat exchanger 66 (e.g. condenser), an interior heat exchanger 68 (e.g. evaporator), an accumulator 70, fittings, valves and expansion devices. The condenser 66 may be located behind the grille near the front of the vehicle, and the evaporator 68 may be disposed within the housing 58. It is to be understood that heat exchangers labeled as "condenser" may also act as an evaporator in some modes.

The cabin loop 54 components are connected in a closed loop by a plurality of conduits, tubes, hoses or lines. For Example, a first conduit 72 connects the compressor 64 and the condenser 66 in fluid communication, a second conduit 74 connects the condenser 66 to a valve 82, a third conduit 76 connects the valve 82 and the evaporator 68 in fluid communication, and a fourth conduit 78 connects the evaporator 68 and the compressor 64 in fluid communication. A first bypass conduit 80 is connected between the valve 82 and conduit 78. The valve 82 may be a solenoid valve that can be opened and closed to supply refrigerant to either conduit 76 or conduit 80 depending upon the operating mode of the heat-pump subsystem 52. For example, refrigerant is circulated into conduit 76 and not into conduit 80 when the air conditioning is ON. The valve 82 may be in communication with a controller 100. An optional heat exchanger 71 may be included to exchange heat between conduit 78 and conduit 76.

A first expansion device 84 may be disposed on conduit 72 and a second expansion device 86 may be disposed on conduit 76. The expansion devices are configured to change the pressure and temperature of the refrigerant in the heat-pump subsystem 52. The expansion devices may include an electronic actuator controlled by the controller 100. The controller 100 may instruct the actuator to position the expansion device in a wide-open position, a fully closed position, or a throttled position. The throttled position is a partially open position where the controller modulates the size of the valve opening to regulate flow through the expansion device. The controller 100 and expansion devices may be configured to continuously or periodically modulate the throttled position in response to system operating conditions. By changing the opening within the expansion device, the controller can regulate flow, pressure, temperature, and state of the refrigerant as needed.

The heat-pump subsystem 52 also includes a battery loop 88 having a chiller 90 and a third expansion device 92. The battery loop 88 may include a supply conduit 94 connected to conduit 76 at fitting 96 and connected to the chiller 90. The expansion device 92 may be on the supply conduit 94. Expansion device 92 may be similar to expansion devices 84 and 86. A return conduit 98 connects the battery chiller 90 and conduit 78 in fluid communication. The return conduit 98 may connect with conduit 78 via fitting 104.

The cabin loop 54 includes a heater core 110, a heater 112, a pump 114, a first valve 116, a sensor 118, and conduit forming a closed loop for circulating coolant, such as an ethylene glycol mixture. The heater 112 may be an electric or gas heater. For example, coolant circulates from the pump 114 to the heater 112 via conduit 120. The heater 112 is connected to the heater core 110 via conduit 122. The heater core 110 is connected to pump 114 via conduit 124. The first valve 116 and the sensor 118 may be disposed on conduit 122. Alternately, conduit 122 may be separate conduits with one conduit connecting the heater 112 and the first valve 116, and another conduit connecting the first valve 116 and the heater core 110. The valve 116 may be a solenoid valve that is electronically controlled by the controller 100.

The cabin loop 54 may extract heat from the heat-pump subsystem 52 via an intermediary heat exchanger 126 in order to provide heating to the cabin. Depending upon operating conditions, the cabin loop 54 can provide heat to the heater core 110 with thermal energy from the heat pump 52, the heater 112, or a combination of both. The intermediary heat exchanger 126 may be a refrigerant-to-coolant heat exchanger. The intermediary heat exchanger 126 facilitates the transfer of thermal energy between the cabin loop 54 and the heat-pump subsystem 52. The intermediary heat exchanger 126 may be part of the cabin loop 54, the heat pump 52, or both. The heat exchanger 126 may have any suitable configuration. For example, the heat exchanger 126 may have a plate-fin, tube-fin, or tube-and-shell configuration that facilitates the transfer of thermal energy without mixing the heat transfer fluids. The heat exchanger 126 may be connected to conduit 72 of the heat pump 52 and to conduit 120 of the cabin loop 54.

The cabin loop 54 is configured to circulate heated coolant to the heater core 110 during at least a heating mode of the climate control system 50. The heater core 110 is disposed within the HVAC housing 58. The heater 112, if electric, is electrically connected to the traction battery 24, which provides power to the electric heater 112. The electric heater 112 may include a resistance heating element that converts electrical energy into thermal energy in order to heat the coolant circulating through the heater 112. The fan 60 disposed within the HVAC housing 58 circulates air across the heater core 110 to extract heat from the coolant, and blows the heated air into the cabin to heat the cabin. The sensor 118 measures the temperature of the coolant circulating in conduit 122 and sends a signal to the controller 100 that is indicative of the coolant temperature. Based on this temperature signal, the controller may increase or decrease a heating output of the heater 112, the heat pump 52, or both depending upon the source of the thermal energy. The temperature of the coolant can be directly measured or inferred.

The battery thermal management system 62 may operate in a plurality of different modes, such as battery-heating mode or battery-cooling mode. The battery thermal management system 62 includes a battery-coolant loop 130 that regulates the temperature of the traction battery 24. The battery loop 130 includes a battery radiator 132, a chiller 90, a pump 136, a second valve 138, a sensor 140, a third valve 142, and conduit arranged to circulate a coolant—such as an ethylene glycol mixture—between the various components of the battery loop 130. For example, the pump 136 circulates coolant to the battery pack 24 via conduit 146. The sensor 140 may be disposed on conduit 146 upstream of the battery pack 24. The sensor 140 senses the temperature of the coolant and sends a signal indicative of the coolant temperature to the controller 100. Alternatively, the sensor may be omitted, and the coolant temperature is inferred. Coolant exiting the battery pack 24 circulates to a four-way connector 144, and either circulates to the battery radiator 132 or to the chiller 90 depending upon the positioning of the valves 116, 138, 142. The battery loop 130 may cool the traction battery 24 via either the battery radiator 132 or the chiller 90. The chiller 90 dissipates heat by transferring thermal energy from coolant within the battery loop 130 to the heat pump 52. The battery radiator 132 is disposed behind a front grille of the vehicle and dissipates heat to the outside air. An inlet port of the battery radiator 132 is connected to the four-way connector 144 via conduit 148. An outlet port of the battery radiator 132 is connected to an inlet of the valve 142 via conduit 150. An outlet of the valve 142 is connected back to the pump 136 via conduit 146. Another inlet of the valve 142 is connected to an outlet port of the chiller 90 via conduit 154. The valve 138 may be similar to the valve 116. The inlet port of the chiller 90 is connected to the valve 138 via conduit 156. The valve 138 may be similar to the valve 116. The valve 138 is connected to the four-way connector 144 via conduit 158. The valve 138 may be connected to conduit 122 of the cabin loop 54 via a first interconnecting conduit 160. The four-way connector 144 may be connected to the first valve 116 of the cabin loop 54 via a second interconnecting conduit 162.

The range of an electric vehicle is at least partially dependent upon the amount of stored energy in the battery pack. Current battery technologies are limited in the amount of energy that can be stored within the battery pack. Vehicle range may be extended by using more battery energy for a vehicle propulsion and less battery energy for ancillary operations, such as heating the battery or cabin. One way to increase vehicle range is to precondition one or more systems of the vehicle prior to departure. During preconditioning, the vehicle is electrically connected with the charging station 38 and wall power is available. Used herein, wall power refers to any external electrical power source, such as the power grid or local solar power. During preconditioning, the wall power is used to energize the vehicle systems instead of the battery to preserve battery power for when the vehicle is being driven. The vehicle may be preconditioned by heating the battery, the cabin, or both via the wall power prior to departure. The controller 100 may receive input from a user scheduling the next departure time (or time to next planed usage) or may estimate a departure time based on customer habits. Based on this departure time, the controller will begin preconditioning one or more of the vehicle systems at an appropriate time prior to departure. The duration of preconditioning varies according to the systems being preconditioned and the ambient conditions. For example, the battery typically requires a longer duration of preconditioning than the passenger cabin. As such, the controller may request heating of the battery prior to the cabin. Also, the vehicle may require a longer duration of preconditioning when the air temperature is colder.

Preconditioning may be broken up into several different modes, such as battery heating mode, battery-cooling mode, cabin-cooling mode, and cabin-heating mode. These modes may operate simultaneously or may operate one at a time depending upon vehicle conditions, time to next planned usage, and available wall power. Some of these modes will now be described below in detail.

Figure 3:
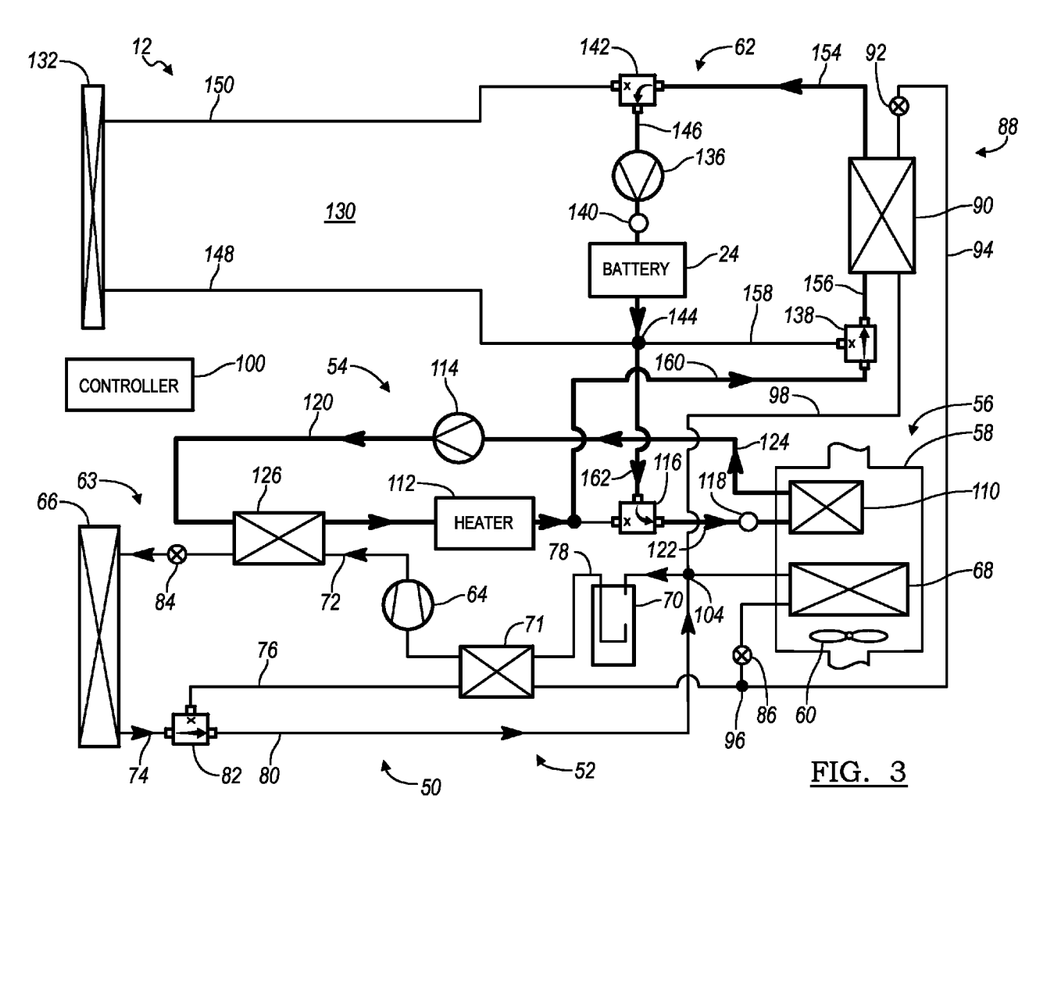
FIG. 3 is the schematic diagram of FIG. 2 shown in a battery and cabin-heating mode.

Referring to FIG. 3, an example battery and cabin heating mode is shown. Heated coolant is circulated to the traction battery 24 and the heater core 110 to raise a temperature of the battery cells and the cabin to a desired temperature. Rather than having a pair of dedicated heaters (i.e. one for the battery loop and one for the cabin loop), the thermal circuit is arranged such that the heater 112 and the heat exchanger 126 can heat both the battery loop 130 and the cabin loop 54. In the illustrated embodiment, the valves are actuated such that the cabin loop 54 and the battery loop 130 are interconnected to form a single thermal circuit. Thus, coolant heated by the heater 112 or the heat exchanger 126 can be circulated to the battery, the heater core 110 or both. Bold lines signify active conduits of the thermal circuit. The heat pump 52 may be ON or OFF and is not bolded.

The controller 100 sends signals to the valves 116, 138, and 142, and in response, the valves actuate into a desired position. For example, valve 116 may be actuated such that coolant in conduit 120 is circulated to the battery loop 130 via interconnecting conduit 160. Valve 138 is actuated such that coolant circulates to conduit 156 and not to conduit 158. Valve 142 is actuated such that coolant circulates to conduit 146 and not to conduit 150. The controller 100 may also send signals to the pump 136 and the pump 114 instructing the pumps to begin circulating coolant through the thermal circuit. One or both pumps may be energized. The coolant is circulated through the heat exchanger 126 and the heater 112—where the coolant absorbs heat for one or both depending upon operating conditions—and to the battery pack 24 via interconnecting conduit 160 and conduits 156, 154, and 146. The cells within the battery pack 24 absorb a portion of the thermal energy in the coolant as the coolant passes through the battery pack 24. The coolant then circulates back to the cabin loop 54 via interconnecting conduit 162. Valve 116 is actuated to direct coolant to the heater core 110. If energized, the fan 60 circulates air across the heater core 110 and blows warm air into the cabin. The coolant exiting the heater core 110 is then recirculated back to the pump 114 via conduit 124. During heating mode, the controller monitors the various sensors (e.g. 118 and 140) and may adjust a heating output of the heater and the heat pump as desired. During a battery-only heating mode, the fan 60 is turned OFF and the valves and pumps are actuated the same as above. In some embodiments, the cabin loop 54 includes a bypass conduit and valving to bypass the heater core 110 when the cabin is not being heated. While this preconditioning mode is being described in conjunction with the embodiment shown in FIG. 2, this mode is equally applicable to the vehicle of FIG. 5.

During a cabin or battery heating mode, the thermal energy may be supplied by the electric heater 112, the heat pump 52, or both via the heat exchanger 126. If at least a portion of the thermal energy is being provided by the heat pump 52, the controller 100 sends a signal to the heat pump 52 to energize and operate the heat pump 52 in a heating mode. In heating mode, the compressor 64 pressurizes the refrigerant into a hot vapor that is circulated to the heat exchanger 126. Thermal energy from the refrigerant is transferred into the coolant circulating through the coolant side of the heat exchanger 126 to heat the coolant in the cabin loop 54. The pump 114 circulates the heated coolant to the heater core 110, the battery pack 24, or both. The heat exchanger 126 acts as a condenser causing the refrigerant to condense into a liquid. Next, the refrigerant passes through the first expansion device 84, which is in a throttled position. The expansion device 84 reduces the pressure of the refrigerant and lowers the temperature of the refrigerant prior to entering the exterior heat exchanger 66. The controller 100 may throttle the expansion device 84 to ensure that the temperature of the refrigerant is below the outside air temperature to facilitate evaporation of the refrigerant within the exterior heat exchanger 66. The heat exchanger 66 is acting as an evaporator and extracts heat from the outside air and transfers the heat into the refrigerant cause the refrigerant to boil. The expansion device 86 is closed and valve 82 is actuated to circulate refrigerant exiting the exterior heat exchanger 66 to flow through conduit 80 bypassing the interior heat exchanger 68. The refrigerant is then circulated through conduit 78 and back to the compressor 64 for recirculation.

Figure 4:
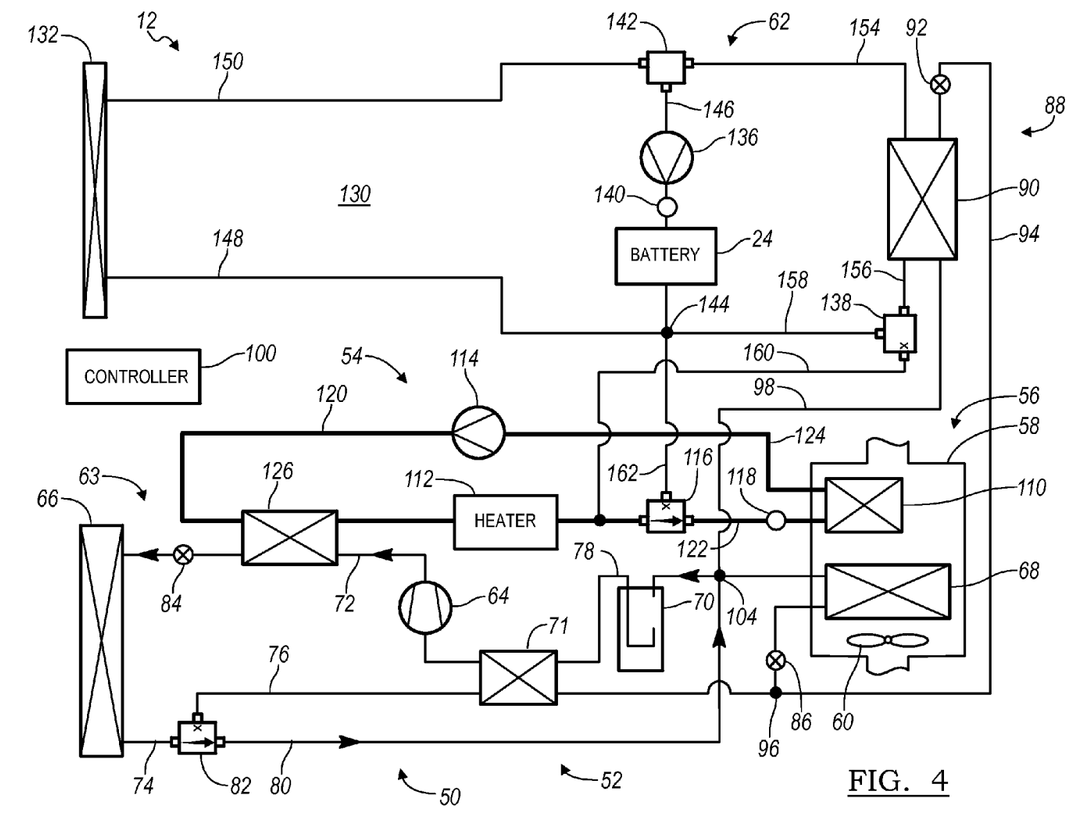
FIG. 4 is the schematic diagram of FIG. 2 shown in a cabin-heating mode.

The valves of the battery thermal management system 62 and the climate control system 50 may be actuated such that the cabin loop 54 and the battery loop 130 operate as separate thermal circuits. For example, this may occur during preconditioning when only the cabin is being heated. FIG. 4 illustrates the climate control system 50 operating in a cabin-preconditioning mode. In this example, only the cabin is being heated and not the battery 24. The valve 116 may be actuated to prevent coolant in interconnecting conduit 162 from circulating into conduit 122, and valve 138 may be actuated to prevent coolant in interconnecting conduit 160 from entering into conduit 156. In a cabin-only heating mode, the pump 114 is energized by the controller 100 in order to circulate coolant through the heater 112, the heat exchanger 126, and into the valve 116. The valve 116 is actuated to allow coolant circulation to the heater core 110 via conduit 122. The cabin blower 60 is actuated to blow air across the heater core in order to heat the cabin. The controller 100 is in electronic communication with sensor 118, which monitors a temperature of the coolant. Based on the coolant temperature, the controller may increase or decrease the heat output of the heater 112 or the heat pump 52, or both as desired. While this heating mode is being described in conjunction with the embodiment shown in FIG. 2, this heating mode is equally applicable to the vehicle according to FIG. 5. During a cabin-only heating mode, the battery thermal management system 62 may be inactive with the pump 136 de-energized. During a cabin-only heating mode, the thermal energy may be supplied by the electric heater 112, the heat pump 52, or a combination of both.

Figure 5:
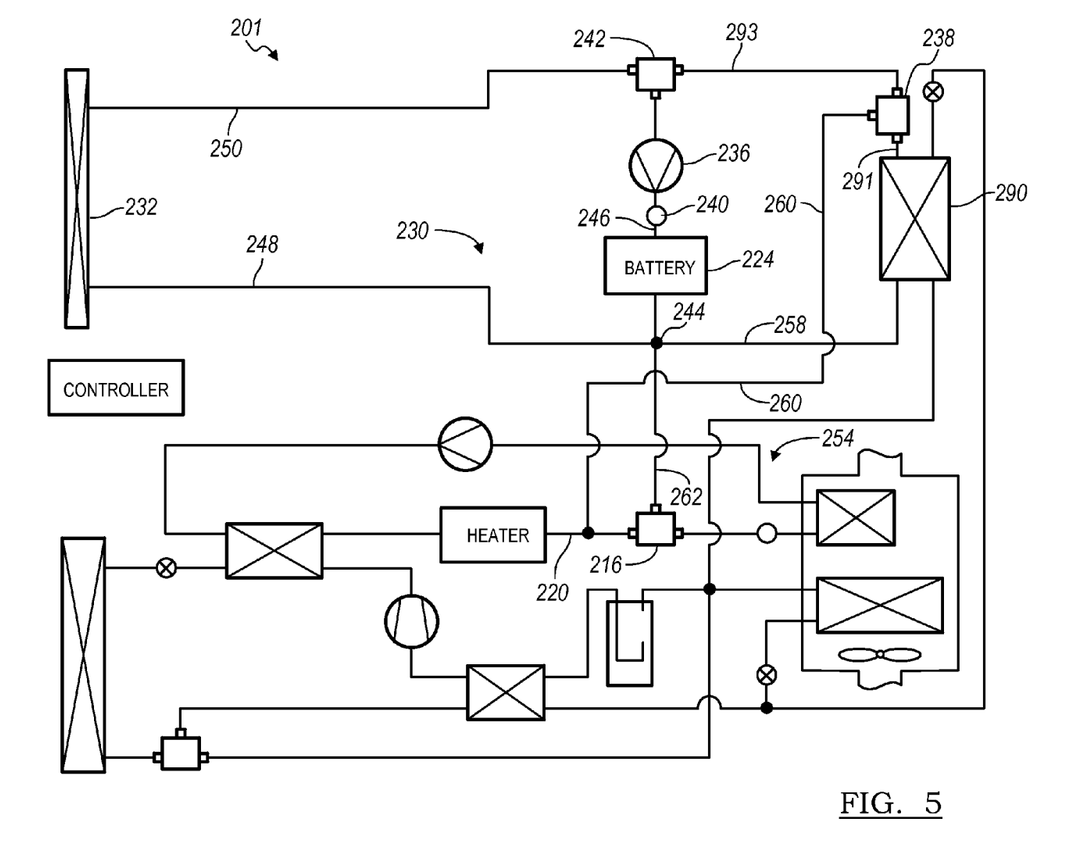
FIG. 5 is a schematic diagram of a battery thermal management system and a climate control system of another vehicle.

FIG. 5 illustrates a vehicle 201 that is very similar to vehicle 12 except the valving and conduit are arranged to enable bypassing of the chiller 290 during certain operating modes. The layout of the cabin loop 254 and the heat pump 252 may be similar to that of FIG. 2 and will not be described again.

The battery loop 230 includes a battery radiator 232, a chiller 290, a pump 236, a valve 238, a sensor 240, a valve 242, and conduit arranged to circulate a coolant—such as an ethylene glycol mixture—between the various components of the battery loop 230. For example, the pump 236 circulates coolant to the battery pack 224 via conduit 246. The sensor 240 may be disposed on conduit 246 upstream of the battery pack 224. Coolant exiting the battery pack 224 circulates to a four-way connector 244, and either circulates to the battery radiator 232 or the chiller 290 depending upon the positioning of the valves 216, 238, 242. The battery loop 230 may cool the traction battery 224 via either the battery radiator 232 or via the chiller 290. An inlet port of the battery radiator 232 is connected to the four-way connector 244 via conduit 248. An outlet port of the battery radiator 232 is connected to an inlet of the valve 242 via conduit 250. An outlet of the second valve 242 is connected back to the pump 236 via conduit 246. Another inlet of the valve 242 is connected to an outlet port of the valve 238 via conduit 293. An inlet port of the valve 238 is connected to an outlet port of the chiller 290 via conduit 291. The inlet port of the chiller 290 is connected to the connector 244 via conduit 258. The valve 238 may be connected to conduit 220 of the cabin loop 254 via a first interconnecting conduit 260. The four-way connector 244 may be connected to the first valve 216 of the cabin loop 254 via a second interconnecting conduit 262. FIGS. 2 and 5 are merely two examples of the climate control and battery thermal management systems: The present disclosure contemplates others. The operating modes described above with reference to FIGS. 3 and 4 are equally applicable to the vehicle shown in FIG. 5.

Figure 6:
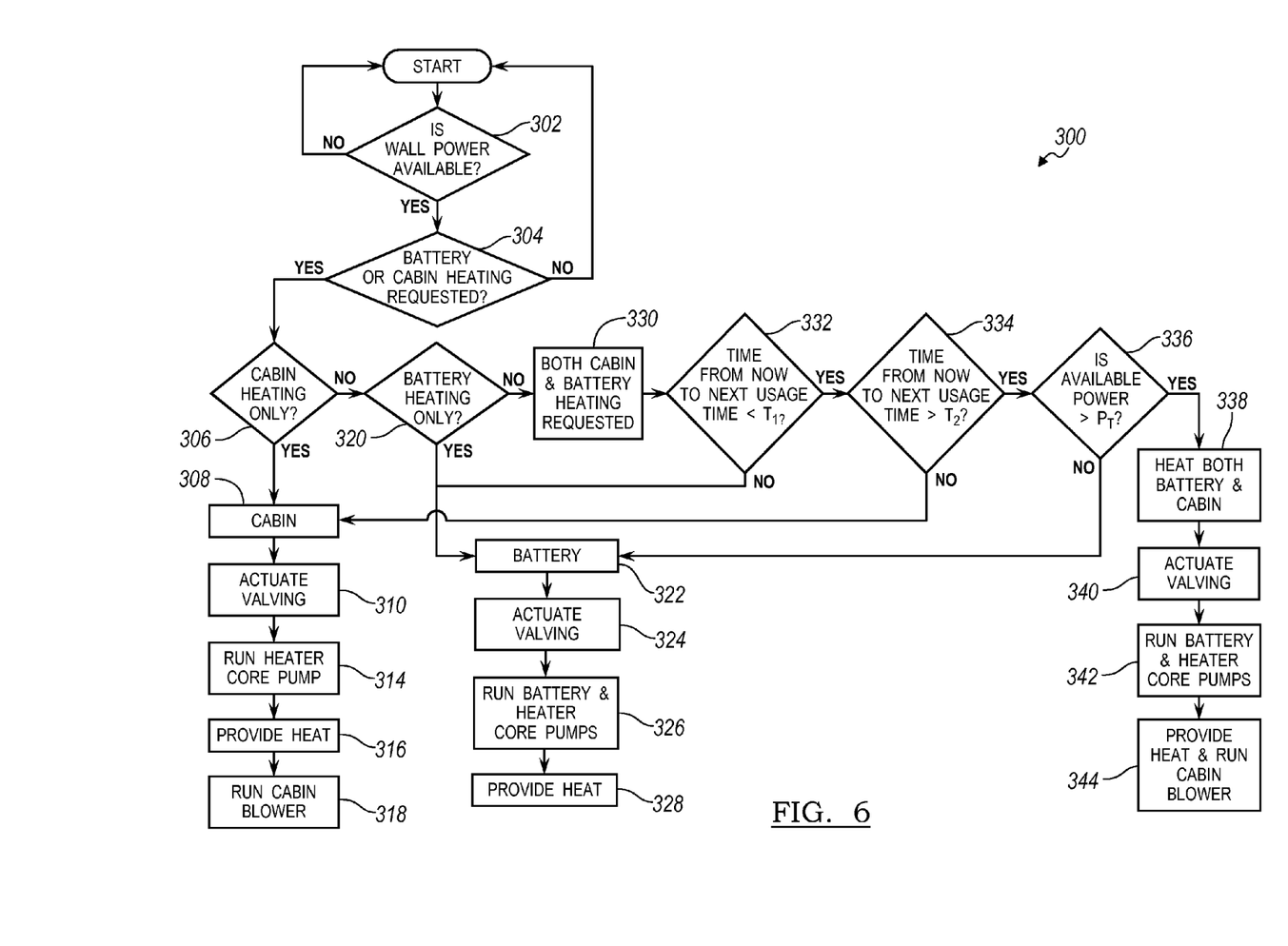
FIG. 6 is a flow chart illustrating logic for preconditioning a vehicle.

Because the charging station has a limited power output, and the heater and heat pump have limited heating output, the controller may have to prioritize and choose which components to heat, and which components not to heat, based on certain conditions. Control strategy 300 describes one embodiment for preconditioning the battery and cabin of the vehicle. The control strategy 300 includes logic for selectively heating the battery, the cabin, or both based on a time to next planned usage of the vehicle. The control strategy 300 may be implemented by one or more controllers (e.g. controller 100) of the vehicle. The control strategy 300 starts by determining if wall power is available at operation 302. If wall power is not available, the vehicle cannot be preconditioned and control loops back to the start. If wall power is available, the controller determines whether battery or cabin heating is being requested at operation 304. Battery heating may be requested if the controller determines that the battery temperature is below a threshold temperature and if a time to next planned usage is less than a threshold time. For example, a request for battery heating is issued if the temperature is below −5° Celsius (C) and the next planned usage is less than 90 minutes. The temperature and length of time prior to the next usage time that triggers a request to heat the battery are calibratable. For example, the colder the battery the earlier the system will request battery heating. Cabin heating may be requested by user preference. For example, the controller may receive inputs from a user indicating a desired cabin temperature. If the controller determines that the cabin is below the desired temperature, cabin heating is requested at an appropriate time prior to the next planned usage (e.g. 15 min.). At operation 306 the controller determines if only cabin heating is requested.

If only cabin heating is being requested, control passes to operation 308 and the cabin is heated according to the following steps. The vehicle, for example vehicle 12, may enter a cabin-only heating mode by actuating the valves 116, 138, and 142 into certain positions. For example, at operation 310 the controller may send a signal to the valves instructing the valves to the position shown in FIG. 4. Once the valves have been actuated into the proper position, control passes to operation 314 and the heater core pump (e.g. pump to 114) is energized and the coolant is circulated through the coolant circuit. At operation 316 the heater 112, the heat pump 52, or both are energized to heat the coolant. A heat output may be increased or decreased based on signals sent from the various temperature sensors—which indicate the coolant temperature at various positions along the coolant circuit—in order to heat the coolant to a desired temperature. At operation 318, the cabin blower is energized. The heating output may also change based on a magnitude of the wall power. The duty cycle of the cabin blower may be determined based on a desired temperature of the cabin, the ambient air temperature, and the coolant temperature. The cabin may receive heat until a temperature of the cabin meets or exceeds a desired temperature, or until operating conditions change to a scenario where cabin heating is no longer desired.

If at operation 304 it is determined that the cabin is not requesting heat, or that the battery is requesting heat, control passes to operation 320. If at operation 320 only the battery is requesting heat, control passes to operation 322 and the battery is heated. The vehicle, for example vehicle 12, may enter a battery-only heating mode by actuating the valves 116, 138, and 142 into certain positions. For example, at operation 324, the controller sends a signal to the valves instructing the valves to the position shown in FIG. 3. Once the valves are actuated into the proper position, control passes to operation 326 and the battery and heater core pumps are energized and coolant is circulated through the coolant circuit. At operation 328 the heater, the heat pump, or both are energized to heat the coolant to a desired battery coolant temperature. A heat output may be increased or decreased based on conditions.

If it is determined that the cabin and the battery are requesting heating, control passes to operation 330. At operation 332 the controller determines if the time from now to the next planned usage of the vehicle is less than a first time threshold ($T_1$). $T_1$ may be a time that is longer than a time required to heat the cabin. For example, $T_1$ may be in a range between 30 and 120 minutes inclusive. If the time to the next planned usage is greater than $T_1$, then control passes to operation 322 and only the battery is preconditioned because preconditioning of the cabin need not occur yet. If at operation 322 the time to the next planned usage is less than $T_1$, then control passes to operation 334. At operation 334 the controller determines if the time from now to the next planned usage is greater than a second time threshold ($T_2$). For example, $T_2$ may be in a range between 2 to 20 minutes inclusive. $T_2$ may represent the minimal time required to have any effect on a temperature of the battery. For any time less than $T_2$, heating the battery is futile. Both $T_1$ and $T_2$ are calibrated values that may be a function of the ambient air temperature, the magnitude of the wall power, and the size of the heat sinks. The controller may include one or more lookup tables having a plurality of different $T_1$ and $T_2$ values depending upon those and other parameters.

If the time to the next usage is not greater than T2, control passes to operation 308 and only the cabin is preconditioned because the time to next planned usage is too soon to have any effect on the battery. If the time the next usage is greater than T2, control passes to operation 336. When the time to next planned usage is less than T1 and greater than T2, both the cabin and the battery are a candidate for heating if a sufficient magnitude of wall power is available. At operation 336 the controller determines if the available wall power (e.g. power supplied by the charging station) is above a power threshold (Pt), which represents a minimal amount of power required to heat both the battery and the cabin. The power threshold may be based, at least in part on, temperature of the ambient air. For example, Pt may be 2 kW. If the available wall power is below Pt, then insufficient power is available to heat both the cabin and the battery. Thus, one must be prioritized over the other. In control logic 300, the battery is prioritized over the cabin. As such, if insufficient power is determined at operation 336, control passes to operation 322 and only the battery is heated. But, if sufficient wall power is available, control passes to operation 338 and both the cabin and the battery are preconditioned. At operation 340 the valves are actuated such that both the battery and the cabin are heated. For example, the valves 116, 138, and 142 are actuated such that the battery loop 130 and the cabin loop 54 form a single coolant circuit as is shown in FIG. 3 and described above. When the battery loop 130 and the cabin loop 54 are combined, heated coolant can be circulated to both the battery 24 and the heater core 110 so that both components may be heated. At operation 342 the battery and the heater core pumps are energized to circulate coolant through the coolant circuit. In some embodiments, only one of the pumps may be run. At operation 344 the heater, the heat pump, or both are energized to output heat into the coolant and the cabin blower is energized once the coolant temperature exceeds a threshold value, such as 40 degrees C. The sensors 118, 140 send signals to the controller 100 indicating a coolant temperature. Based on these signals, the controller can modify the heat output. Control strategy 300 is cycled periodically, such as every 100 milliseconds.

Figure 7:
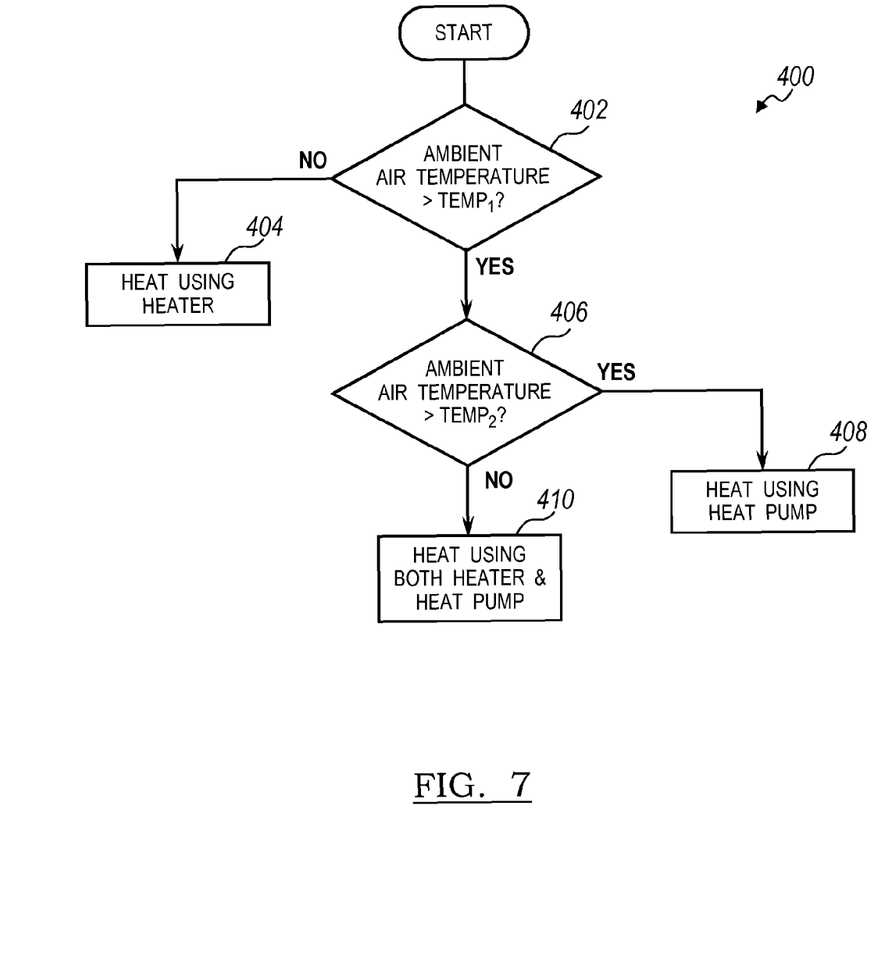
FIG. 7 is a flow chart illustrating logic for determining a duty cycle of a heater and a heat pump.

As described above, the heat may be provided by the heater, the heat pump, or a combination of both. FIG. 7 illustrates a control strategy 400 for determining which components are used to generate the heat based on operating conditions. At operation 402, the controller determines if the ambient air temperature is greater than a first threshold temperature ($Temp_1$). $Temp_1$ may be in a range between −20 to −5 degrees C. inclusive. If the ambient temperature is less than $Temp_1$, then control passes to operation 404 and the heat is provided using the heater (e.g. heater 112 or 212) and not the heat pump. If at operation 402 the ambient air temperature is greater than $Temp_1$, control passes to operation 406. At operation 406, the controller determines if the ambient air temperature is greater than a second temperature threshold ($Temp_2$). $Temp_2$ may be in a range between 5 to 20 degrees C. inclusive. If yes, control passes to operation 408 and the heat pump is used to provide heating and the heater is not. This may be accomplished by the controller sending one or more signals to energize the heat pump and sending a signal to de-energize the heater if necessary. If at operation 406 the ambient air temperature is below $Temp_2$, control passes to operation 410 and the system is heated using both the heater and the heat pump. The controller may include lookup tables and algorithms for determining the work-load split between the heater and the heat pump. This split may be based on at least the ambient air temperature and the amount of heating required.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
    a cabin;
    a traction battery configured to receive wall power from a charging station;
    a coolant circuit including the battery, a heater core, a heat exchanger, and valving;
    a heat pump in fluid communication with the heat exchanger; and
    a controller programmed to, in response to a request to heat the battery and the cabin, and a time to next planned usage of the vehicle being less than a first threshold time, actuate the valving to circulate coolant to the heater core and not the battery when wall power is available, and energize the heat pump to supply heat to the coolant circuit via the heat exchanger when an ambient air temperature exceeds a threshold temperature.

2. The vehicle of claim 1 wherein the controller is further programmed to, in response to the ambient air temperature being less than the threshold temperature, energize an electric heater of the coolant circuit to supply heat to the heater core.

3. The vehicle of claim 1 wherein the threshold temperature is a first threshold temperature, and wherein the controller is further programmed to, in response to the ambient air temperature exceeding the first threshold temperature and being less than a second threshold temperature, energize an electric heater of the coolant circuit to supply heat to the heater core using both the heat pump and the heater.

4. The vehicle of claim 3 wherein the controller is further programmed to, in response to the ambient air temperature exceeding the second threshold temperature, de-energize the heater to supply heat to the coolant circuit using only the heat pump.

5. The vehicle of claim 1 wherein the controller is further programmed to, in response to the time to next planned usage exceeding the first threshold time, actuate the valving to circulate coolant to the battery to heat the battery.

6. The vehicle of claim 5 wherein the controller is further programmed to, in response to the time to next planned usage exceeding the first threshold time and being less than a second threshold time, energize a cabin blower when a magnitude of the wall power exceeds a threshold power.

7. The vehicle of claim 6 wherein the controller is further programmed to, in response to the time to next planned usage exceeding the second threshold time, delay heating of the cabin blower at least until the time to next planned usage is less than the second threshold time.

8. A method for preconditioning a vehicle comprising:
in response to a request to heat a battery and cabin, and a time to next planned usage of the vehicle being less than a first threshold time, actuating valving to circulate coolant to a heater core and not a battery when wall power is available; and
energizing a heat pump to supply heat to the heater core when an ambient air temperature exceeds a threshold temperature.

9. The method of claim 8 further comprising, in response to the ambient air temperature being less than the threshold temperature, energizing an electric heater to supply heat to the heater core.

10. The method of claim 8 wherein the threshold temperature is a first threshold temperature, further comprising, in response to the ambient air temperature exceeding the first threshold temperature and being less than a second threshold temperature, energizing an electric heater to supply heat to the heater core using both the heat pump and the heater.

11. The method of claim 10 further comprising, in response to the ambient air temperature exceeding the second threshold temperature, supplying heat to the heater core using only the heat pump.

12. The method of claim 8 further comprising, in response to the time to next planned usage exceeding the first threshold time, actuating the valving to circulate coolant to the battery to heat the battery.

13. The method of claim 12 further comprising, in response to the time to next planned usage exceeding the first threshold time and being less than a second threshold time, energizing a cabin blower when a magnitude of the wall power exceeds a threshold power.

14. The Method of claim 13 further comprising, in response to the magnitude of the wall power being less than the threshold power, de-energizing the cabin blower.

15. A vehicle comprising:
a cabin;
a traction battery configured to receive wall power from a charging station;
a coolant circuit including the battery, a heater core, a heat exchanger, and valving;
a heat pump in fluid communication with the heat exchanger; and
a controller programmed to, in response to a request to heat the battery and the cabin, and a time to next planned usage of the vehicle exceeding a threshold time, actuate the valving to circulate coolant to the battery and the heater core when wall power is available, and energize the heat pump to supply heat to the coolant circuit via the heat exchanger when an ambient air temperature exceeds a threshold temperature.

16. The vehicle of claim 15 wherein the controller is further programmed to, in response to the ambient air temperature being less than the threshold temperature, energize a heater of the coolant circuit to supply heat to the battery and the heater core.

17. The vehicle of claim 15 wherein the threshold temperature is a first threshold temperature, and wherein the controller is further programmed to, in response to the ambient air temperature exceeding the first threshold temperature and being less than a second threshold temperature, energize a heater of the coolant circuit to supply heat to the battery and the heater core using both the heat pump and the heater.

18. The vehicle of claim 17 wherein the controller is further programmed to, in response to the ambient air temperature exceeding the second threshold temperature, supply heat to the battery and the heater core using only the heat pump.

19. The vehicle of claim 15 wherein the controller is further programmed to, in response to a magnitude of the wall power being greater than a threshold power, energize a cabin fan.

20. The vehicle of claim 15 wherein the controller is further programmed to, in response to the time to next planned usage being less than the threshold time, actuate the valving to circulate coolant to the heater core and not the battery.

* * * * *